Figure 1:
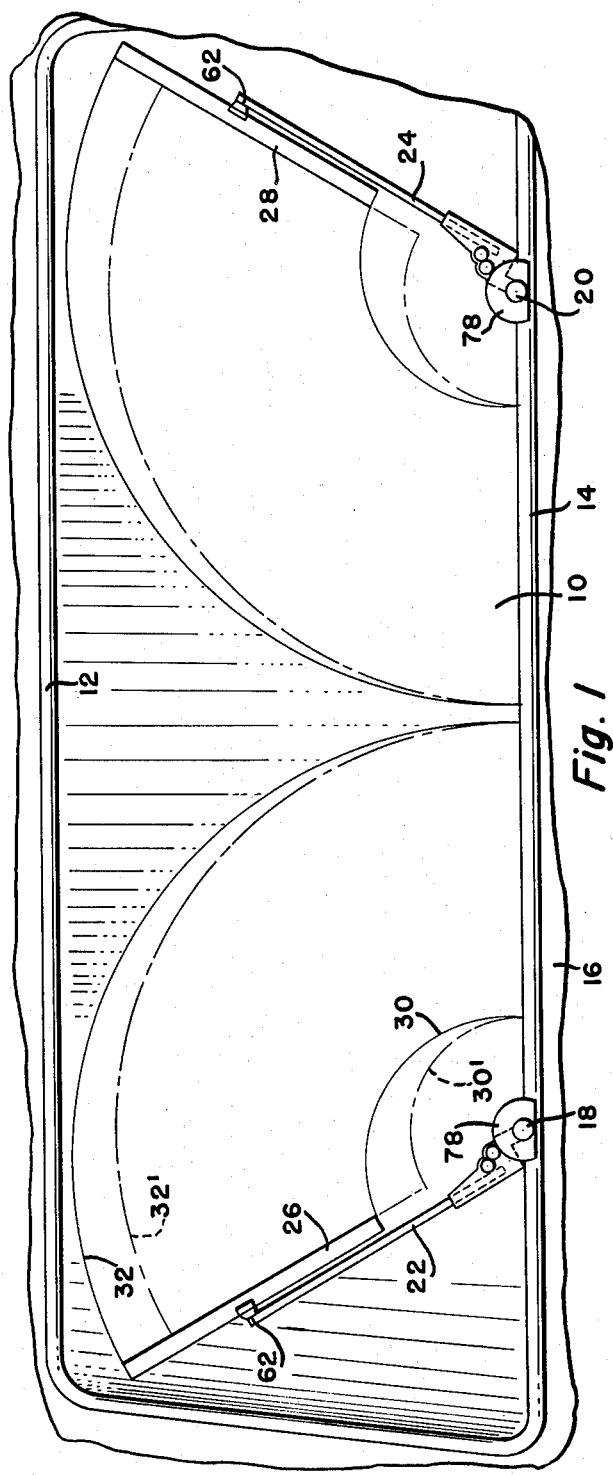

Oct. 10, 1961     E. R. ZIEGLER     3,003,173
WINDSHIELD WIPER MECHANISM

Filed Aug. 12, 1959     2 Sheets-Sheet 1

INVENTOR.
Eugene R. Ziegler
BY
His Attorney

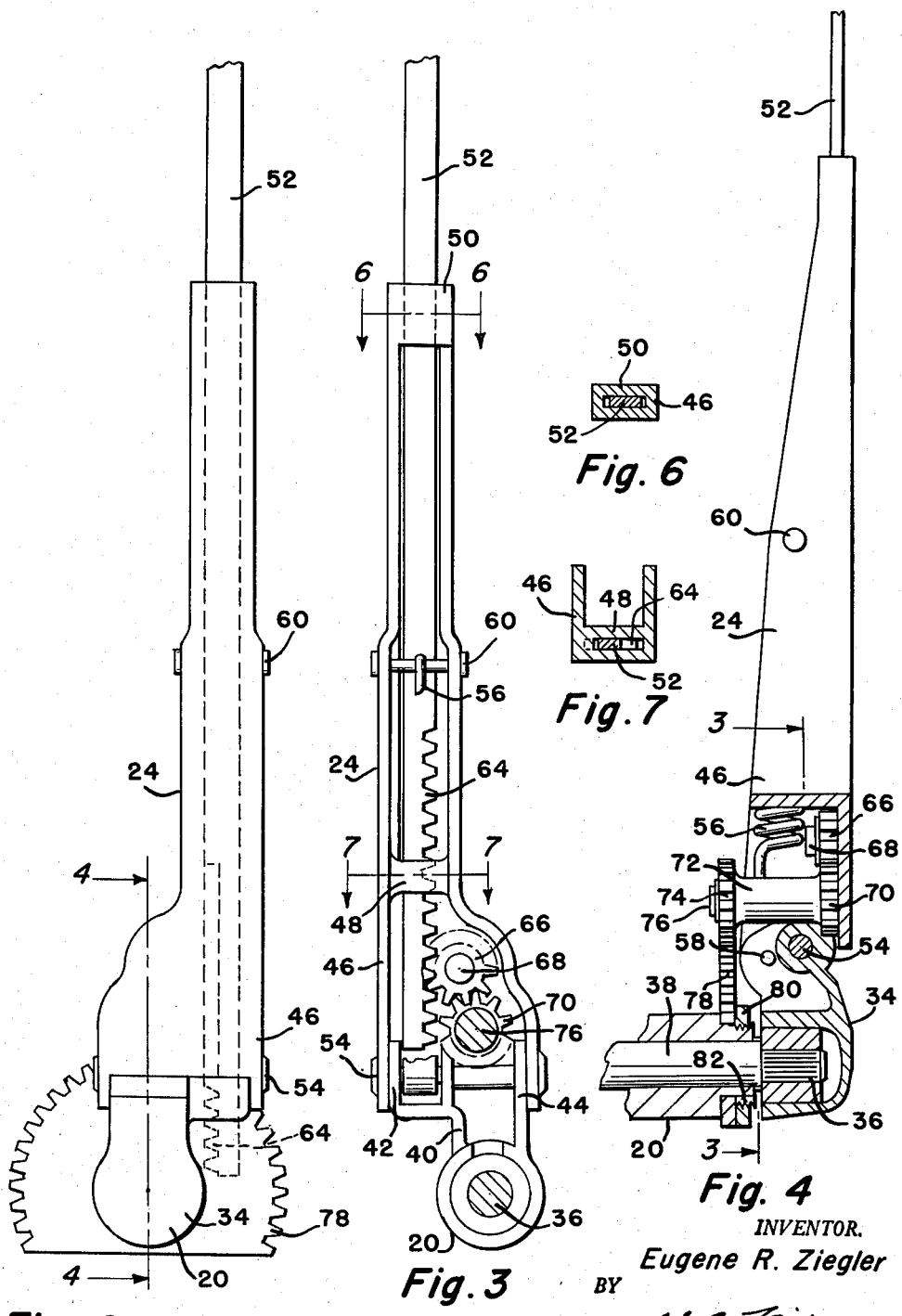

United States Patent Office 3,003,173
Patented Oct. 10, 1961

3,003,173
WINDSHIELD WIPER MECHANISM
Eugene R. Ziegler, Spencerport, N.Y., assignor to General Motors Corporation, Detroit, Mich., a corporation of Delaware
Filed Aug. 12, 1959, Ser. No. 833,179
11 Claims. (Cl. 15—250.23)

This invention pertains to the art of windshield cleaning, and particularly to windshield wiper mechanism including extensible wiper arms.

At the present time the majority of motor vehicles are equipped with windshield cleaning mechanism comprising a pair of spaced wiper arms carrying wiper blades which are oscillated either asymmetrically or symmetrically across the outer surface of the windshield. The pivot axes of the wiper arms are spaced apart a distance sufficient to allow the wiper blades to be parked in a substantially horizontal position against the lower reveal molding of the windshield. The present invention relates to windshield wiper mechanism including extensible arms for increasing the radius of the paths of the wiper blades as the blades move from the horizontal, or inboard, stroke end position, to the outboard stroke end position so that a greater portion of the upper half of the windshield will be cleaned than with conventional wiper mechanisms. Accordingly, among my objects are the provision of windshield wiper mechanism including a pair of wiper blades carried by longitudinally adjustable wiper arms including means for automatically varying the length of the wiper arms during oscillatory movement thereof; the further provision of an extensible wiper arm comprising a pair of relatively movable sections and gear means operable to automatically vary the length of the wiper arm during oscillation thereof; and the still further provision of windshield wiper mechanism including an adjustable wiper arm and control means operable to automatically extend the arm on the outboard stroke and retract the arm on the inboard stroke.

The aforementioned and other objects are accomplished in the present invention by utilizing a control gear train which reacts against a stationary gear member to adjust the operative length of the arm in accordance with the angular position of the arm relative to the horizontal parked position thereof. Specifically, the improved wiper arm comprises a socket section adapted to be drivingly connected to a pivot shaft, an intermediate section spring hinged to the socket section for applying wiping pressure to a wiper blade, and an outer section supported for sliding movement relative to the intermediate section along the longitudinal axis of the arm. The terminal end of the outer arm section is adapted to be detachably connected to a wiper blade and the inner end of the outer section is formed with an integral rack. A pinion gear, journalled on a stub shaft carried by the intermediate arm section, meshes with an idler gear journalled on a second stub shaft carried by the intermediate arm section. The idler gear is formed as an integral part of a sleeve having a second idler gear of the same pitch diameter at the outer end thereof, the second idler gear meshing with a stationary reaction gear attached to the housing for the pivot shaft.

The pivot shafts can be oscillated by any suitable drive mechanism so as to move the arms between inboard and outboard stroke end positions during wiper operation. When wiper operation is discontinued, the drive mechanism may be operable to move the arms and the blades to a substantially horizontal, parked position beyond the inboard stroke end limit. During oscillation of the arm from the inboard stroke end limit to the outboard stroke end limit, which may include an angle of substantially 120°, the idler gear means rotates about its own axis due to engagement with the stationary reaction gear. The idler gear mechanism in turn imparts rotation to the pinion drive gear that meshes with the integral rack on the outer arm section so as to move the outer arm section outwardly, or away, from the pivot shaft. The wiper arm will be in its fully extended position at the outboard stroke end limit. During the inboard stroke of the wiper arm, the pinion rotates in the opposite direction so as to progressively retract the outer wiper arm section. The arm will be fully retracted when it is in the horizontal, or depressed, parked position. By progressively increasing and decreasing the operative length of the wiper arm during oscillation thereof a greater portion of the upper half of the windshield, which constitutes the primary field of vision, will be cleaned.

Further objects and advantages of the present invention will be apparent from the following description, reference being had to the accompanying drawings, wherein a preferred embodiment of the present invention is clearly shown, wherein similar numerals denote similar parts throughout the several views.

Figure 5:
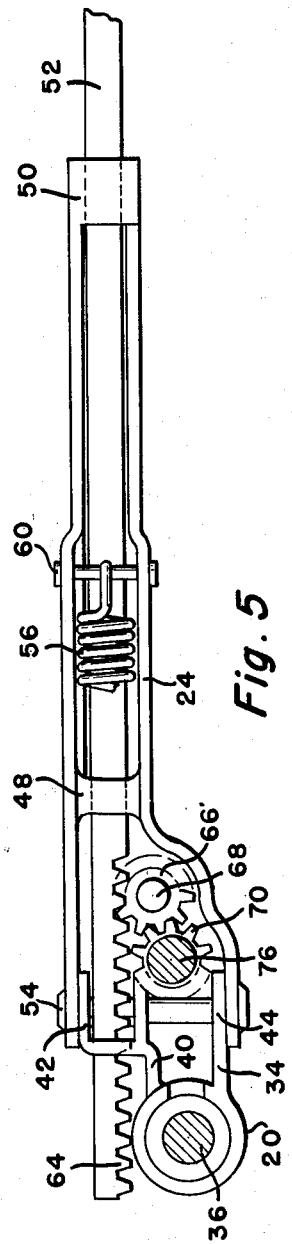

In the drawings:
FIGURE 1 is a fragmentary, perspective view, partly in section and partly in elevation, of a vehicle equipped with the extensible wiper arms and control means of this invention.
FIGURE 2 is a fragmentary view of the improved wiper arm.
FIGURE 3 is a fragmentary sectional view taken along lines 3—3 of FIGURE 4.
FIGURE 4 is a fragmentary sectional view taken along lines 4—4 of FIGURE 2.
FIGURE 5 is a view, in elevation, of the wiper arm in the depressed parked position.
FIGURES 6 and 7 are sectional views taken along lines 6—6 and 7—7 of FIGURE 3.

With particular reference to FIGURE 1, a portion of the vehicle is shown including a windshield 10 having a frontal portion of compound curvature that is considerably displaced from the vertical. The upper edge of the windshield is defined by an upper reveal molding 12 having downwardly extending side pillar portions, and the lower edge of the windshield is defined by a lower reveal molding 14 which is attached to the vehicle cowl 16. A pair of stationary, spaced pivot shaft housings 18 and 20 are suitably attached to the cowl, the pivot, or wiper, shaft being rotatably supported in each housing. Wiper arms 22 and 24 are drivingly connected to the pivot shafts, the wiper arms carrying wiper blades 26 and 28, respectively which are oscillated over asymmetrical paths across the frontal portion of the windshield 10. Any suitable drive mechanism, well known in the art, may be employed to impart asymmetrical oscillation to the wiper arms 22 and 24 between inboard stroke end positions indicated by lines 30 and 30' and outboard stroke end positions indicated by lines 32 and 32'. The wiper blades 26 and 28 may also be moved to a depressed parked position at which time they engage the lower reveal molding 14 of the windshield and are located in a substantially horizontal plane when the drive means is inactivated.

With particular reference to FIGURES 2 through 5, the wiper arms 22 and 24 are of identical construction except for the right and left hand terminal portions thereof. Thus, each wiper arm includes a socket, or mounting, section 34 which is drivingly connected to a serrated burr 36 attached to a pivot shaft 38 journalled in the housing 18 or 20. The socket section 34 may conveniently comprise a die cast metal part having a partially offset radially extending portion 40 having ears 42 and 44 which are straddled by the inner end of an intermediate arm section 46 of channel cross-section. The intermediate arm section 46 has a pair of spaced webs 48 and 50 interconnecting the side walls of the channel forming slots for guiding an extensible outer arm section 52 which is of substantially rectangular configuration. The intermediate arm section 46 is connected by means of a pivot pin 54 to the socket section 34, the axis of the pivot pin 46 being located in a plane substantially normal to the axis of the pivot shaft 38. In addition, the intermediate section 46 and the socket section 34 are interconnected by a helical spring 56, one end of which engages a pin 58 carried by the socket section 34 and the other end of which engages a pin 60 carried by the intermediate section 46. The spring 56 is employed to apply wiping pressure to the wiper blades 26 and 28 carried by the terminal end 62 of the outer arm section 52.

The outer arm section 52 is supported for longitudinal sliding movement relative to the intermediate arm section 46 along the longitudinal axis of the arm. The inner end of the outer arm section 52 has a series of gear teeth 64 constituting a rack. The radial extension 40 of the socket section 34 is offset to facilitate complete retraction of the outer arm section 52 when the wiper arm is in a substantially horizontal position, as indicated in FIGURE 5.

A drive pinion 66 journalled on a stub shaft 68 carried by the intermediate arm section 46 has continuous meshing engagement with the rack 64. The drive pinion 66 also has continuous meshing engagement with a first idler gear 70 constituting part of the reverse idler gear assembly including an integral sleeve 72 and a second idler gear 74. The idler gear assembly is rotatably journalled on a second stub shaft 76 carried by the intermediate arm section, the axis of which is parallel to but spaced from the axis of the stub shaft 68. As seen particularly in FIGURE 4, the second idler gear 74 has continuous meshing engagement with a stationary reaction gear segment 78 fixedly attached to the pivot shaft housing by a nut 80. Preferably, the gear segment 78 is keyed to the housing as indicated by numeral 82 so as to positively preclude relative rotation between the housing and the gear segment. The width of the stationary gear segment 78 is sufficient to assure engagement between the idler gear 74 and the gear segment 78 over the maximum rise and fall of the intermediate arm section 46 as it follows the curved surface of the windshield and pivots about the axis of pin 54. Of course, when the arm is manually shifted away from the windshield, the idler gear 74 can be disengaged from the stationary gear segment 78. The wiper arm is assembled with the pivot shaft 38 in a horizontal, or depressed parked position with the outer arm section 52 in the fully retracted position as shown in FIGURE 5. In this position, the rack portion 64 of the outer arm section 52 extends beyond the inner end of the intermediate arm section 64 as clearly shown in FIGURE 5, this movement being permitted by the offset radial extension 40 of the socket section 34.

As the wiper arm is oscillated during the outboard stroke from the parked position, the outer arm section 52 will be progressively extended, since during rotation of the arm in the clockwise direction, the idler gear assembly will be rotated in the counterclockwise direction as viewed in FIGURE 2 thereby imparting clockwise rotation to the drive pinion 66. Clockwise rotation of the drive pinion 66, as viewed in FIGURE 2, will impart radial outward, or extending, movement to the outer arm section 52 thereby increasing the radius of the wiper blade path with respect to the axis of the pivot shaft 38. The outer arm 52 will be in a maximum extended position at the outboard stroke end limit, or position. During the inboard stroke of the wiper arm, in the counterclockwise direction, as viewed in FIGURE 5, the outer arm section will be progressively retracted. Thus, as seen in FIGURE 2, during an inboard stroke of the wiper arm the idler gear assembly will be rotated in the clockwise direction thereby imparting counterclockwise rotation to the drive pinion 66. Counterclockwise rotation of the drive pinion 66 will effect inward radial movement of the outer arm section 52 through the rack 64.

Referring again to FIGURE 1, the wiper arms will be in the fully retracted position when the blades are in the depressed parked position against the lower reveal molding. As the wiper arms are moved to the outboard stroke end limits indicated by numerals 32 and 32′, the wiper arms will be progressively extended thereby increasing the radius of the terminal end of the wiper arms. Thus, as the blades and arms are oscillated from the inboard stroke end positions to the outboard stroke end positions, the outer section of the arms will be extended thereby shifting the path of movement of the wiper blades so as to increase the area of the upper half of the windshield which is cleaned by the wiper blades as compared to a conventional windshield blade and arm assembly as shown in dotted lines in FIGURE 1. Conversely, during movement of the wiper blades from the outboard stroke end positions to their inboard stroke end positions, the wiper arms will be progressively retracted. The dotted line in FIGURE 1 indicates the paths of conventional wiper blade and arm assemblies showing the area wiped by the blades. The full line indicates the shifted blade path and the increased area of the upper half of the windshield which is wiped by the extensible arm and control means of this invention.

While the embodiment of the invention as herein disclosed constitutes a preferred form, it is to be understood that other forms might be adopted.

What is claimed is as follows:

1. Windshield wiper mechanism including, a stationary housing, an oscillatable wiper shaft journalled in said housing, a longitudinally adjustable wiper arm drivingly connected to said wiper shaft and oscillatable between inboard and outboard stroke limits, said wiper arm comprising a mounting section drivingly connected with said shaft, an intermediate section spring hinged to said mounting section and an outer section slidably mounted on said intermediate section, a wiper blade carried by said wiper arm for movement across the surface of a windshield, and gear means reacting against said stationary housing and engaging the outer section of said wiper arm for extending and retracting said arm during oscillation thereof whereby the arm is extended adjacent the outboard stroke limit and retracted adjacent the inboard stroke limit.

2. Windshield wiper mechanism including, a stationary housing, an oscillatable wiper shaft journalled in said housing, a wiper arm drivingly connected to said wiper shaft including a mounting section drivingly connected to said shaft and a pair of sections adapted for relative longitudinal movement, a wiper blade carried by one of said sections for movement across the surface of a windshield, a spring hinge connecting the other section and the mounting section of said wiper arm for maintaining said wiper blade in engagement with the surface of said windshield, and gear means reacting against said stationary housing and operatively engaging said one section for imparting longitudinal movement thereto, the construction and arrangement being such that said one section moves outwardly relative to the wiper shaft during oscillation of said arm from a substantially horizontal position.

3. Windshield wiper mechanism including, a stationary housing, an oscillatable wiper shaft journalled in said housing, a wiper arm having a socket section drivingly connected to said shaft, an intermediate section pivotally connected to said socket section on an axis substantially normal to the axis of said shaft, resilient means interconnecting the socket section and said intermediate section, and outer section slidably mounted on the intermediate section for longitudinal movement relative thereto, and gear means reacting against said stationary housing and operatively engaging said outer section for imparting longitudinal movement to said outer section in timed relation with oscillation of said arm.

4. A wiper arm including, a socket section, an intermediate section spring hinged to said socket section, an outer section mounted for longitudinal movement relative to the intermediate section, and gear means carried by said intermediate section and operatively engaging said outer section for imparting longitudinal movement thereto.

5. A wiper arm including, a socket section adapted for connection to a pivot shaft, an intermediate section spring hinged to said socket section for movement about an axis substantially normal to the axis of said pivot shaft, an outer section slidably mounted on said intermediate section for longitudinal movement relative thereto, and gear means carried by said intermediate section and drivingly engaging said outer section for imparting longitudinal movement thereto.

6. The wiper arm set forth in claim 5 wherein said outer section is formed with a rack, and wherein said gear means includes a drive pinion engaging said rack.

7. The wiper arm set forth in claim 6 wherein said socket section includes a radial extension having an offset portion, and wherein the rack of said outer section is aligned with said offset portion.

8. Windshield wiper means including, a stationary housing, stationary gear means attached to said housing, an oscillatable wiper shaft journalled in said housing, a longitudinally adjustable wiper arm drivingly connected to said wiper shaft and oscillatable between inboard and outboard stroke limits, said wiper arm comprising a mounting section drivingly connected with said shaft, an intermediate section spring hinged to said mounting section and an outer section slidably mounted on said intermediate section, and gear means carried by said arm and operatively engaging said stationary gear means and said outer section of the wiper arm for automatically controlling the operative length of the wiper arm during oscillation thereof.

9. Windshield wiper mechanism including, a stationary housing, an oscillatable wiper shaft journalled in said housing, a wiper arm comprising a socket section drivingly connected to said wiper shaft, an intermediate section spring hinge connected to said socket section and an outer section slidably mounted on said intermediate section, a stationary gear segment attached to said housing, said wiper arm being oscillated between inboard and outboard stroke limits, a wiper blade carried by said outer section for movement across the surface of a windshield, and gear means carried by said intermediate section and operatively engaging said stationary gear segment and said outer section for imparting longitudinal movement thereto, the construction and arrangement being such that said outer section is extended during movement of said arm from the inboard stroke limit to the outboard stroke limit, and is retracted during movement of the wiper arm from the outboard stroke limit to the inboard stroke limit, said stationary gear segment being of sufficient width to assure engagement between the gear means carried by said intermediate section and said stationary gear during pivotal movement of said intermediate section as it follows the contour of the surface of said windshield.

10. A wiper arm including, a mounting section having a partially offset radially extending portion, an intermediate section of channel shape straddling said radially extending portion of said mounting section and spring hinge connected thereto, an outer section slidably supported for longitudinal movement relative to the intermediate section in alignment with the offset portion of said mounting section, and gear means carried by said intermediate section and operatively engaging said outer section for imparting longitudinal movement thereto.

11. The wiper arm set forth in claim 10 wherein said outer section includes a toothed portion constituting a rack which is movable into and out of said intermediate section, the partially offset radially extending portion of said mounting section facilitating movement of said rack out of said intermediate section.

References Cited in the file of this patent

FOREIGN PATENTS

| | | |
|---|---|---|
| 202,095 | Australia | June 6, 1956 |
| 625,469 | Germany | May 20, 1934 |
| 804,428 | France | Aug. 3, 1936 |
| 827,531 | France | Jan. 28, 1938 |